US012325030B2

(12) United States Patent
Stretch et al.

(10) Patent No.: US 12,325,030 B2
(45) Date of Patent: Jun. 10, 2025

(54) METHOD FOR THE BENEFICIATION OF IRON ORE STREAMS

(71) Applicant: Fortescue Ltd, East Perth (AU)

(72) Inventors: Stephen Stretch, Padbury (AU); Bohdan Ilich, Bicton (AU)

(73) Assignee: FORTESCUE METALS GROUP LTD, East Perth (AU)

( * ) Notice: Subject to any disclaimer, the term of this patent is extended or adjusted under 35 U.S.C. 154(b) by 467 days.

(21) Appl. No.: 17/622,928

(22) PCT Filed: Jul. 2, 2020

(86) PCT No.: PCT/AU2020/050694
§ 371 (c)(1),
(2) Date: Dec. 27, 2021

(87) PCT Pub. No.: WO2021/000020
PCT Pub. Date: Jan. 7, 2021

(65) Prior Publication Data
US 2022/0258177 A1 Aug. 18, 2022

(30) Foreign Application Priority Data
Jul. 3, 2019 (AU) ................................ 2019902359

(51) Int. Cl.

| | |
|---|---|
| ***B03C 1/005*** | (2006.01) |
| ***B03C 1/02*** | (2006.01) |
| ***B03C 1/24*** | (2006.01) |
| ***C22B 1/00*** | (2006.01) |

(52) U.S. Cl.
CPC .................. *B03C 1/24* (2013.01); *B03C 1/02* (2013.01); *B03C 1/005* (2013.01); *B03C 2201/20* (2013.01); *C22B 1/00* (2013.01)

(58) Field of Classification Search
CPC .................................. B03C 1/005; B03C 1/24
See application file for complete search history.

(56) References Cited

FOREIGN PATENT DOCUMENTS

| | | | |
|---|---|---|---|
| CN | 102228865 | A | 11/2011 |
| CN | 103752403 | A | 4/2014 |
| CN | 106733141 | A | 5/2017 |
| CN | 108212506 | A | 6/2018 |
| CN | 108580029 | A | 9/2018 |
| CN | 109675715 | A | 4/2019 |
| CN | 109909057 | A | 6/2019 |

OTHER PUBLICATIONS

Zhao et al—CN108212506 A machine translation—Jun. 29, 2018 (Year: 2018).*

(Continued)

*Primary Examiner* — Bradley R Spies
(74) *Attorney, Agent, or Firm* — Harness, Dickey & Pierce, PLC

(57) ABSTRACT

A method of beneficiating iron ore streams, the method comprising the steps of sizing an iron ore stream to provide a fines fraction of less than 3.0 mm diameter particle size and contacting the fines fraction with a magnetic field and magnetically separating the fines fraction into a concentrate stream and a tailings stream.

21 Claims, 5 Drawing Sheets

(56) References Cited

OTHER PUBLICATIONS

International Search Report and Written Opinion of the International Searching Authority, issued in PCT/AU2020/050694, mailed Jul. 2, 2020; ISA/AU.
Article from the Iron Ore Conference in Perth, WA, entitled: "The Fortescue Metals Group Story—From Exploration to the Third Largest Iron Ore Producer in Australia" by: J M F Clout, dated: Jul. 27-29, 2009 (8 Pages).
Article from the Iron Ore Conference in Perth, WA, entitled: "Not all sub-60% Fe ores are the same: the link between processing and sintering of Fortescue Ores" by: G S Beros, dated: Jul. 22-24, 2019 (9 Pages).
Article from the Iron Ore Conference in Perth, WA, entitled: "Sintering and Metallurgical Performance of Blends Comprising Fortescue Metals Group Rocket Fines" by: D Zhu et al., dated: Aug. 12-14, 2013 (5 Pages).
Evsiovitch S.G. Magnetite Ore Benefication, Moscow, Nedra, 1972, p. 269-271 (Cited in Russia).

* cited by examiner

METHOD FOR THE BENEFICIATION OF IRON ORE STREAMS

CROSS-REFERENCE TO RELATED APPLICATIONS

This application is a 371 U.S. National Stage of International Application No. PCTAU2020/050694, filed on Jul. 2, 2020, which claims priority to Australian application No. 2019902359, filed on Jul. 3, 2019. The entire disclosures of the above applications are incorporated herein by reference.

TECHNICAL FIELD

The present invention relates to a method for the beneficiation of iron ore streams.

BACKGROUND ART

The following discussion of the background to the invention is intended to facilitate an understanding of the present invention. However, it should be appreciated that the discussion is not an acknowledgement or admission that any of the material referred to was part of the common general knowledge in Australia or any other country as at the priority date.

The processing of iron ore often results in the production of low-grade clay-rich fine fractions. The processing of these fractions can be difficult using conventional gravity-based separation as the very fine clay-rich slimes can follow the water split from the processing equipment such as cyclones and classifiers and can impede the performance of downstream equipment such as spirals.

SUMMARY OF INVENTION

In accordance with the present invention, there is provided a method of beneficiating iron ore streams, the method comprising the steps of:

- sizing an iron ore stream to provide a fines fraction of less than 3.0 mm diameter particle size; and
- contacting the fines fraction with a magnetic field and magnetically separating the fines fraction into a concentrate stream and a tailings stream.

In the context of the present specification, the term sizing shall be understood to encompass the separation of materials according to their size. It shall be understood to encompass wet and dry screening, sieving and shaking tables.

In the context of the present invention, the term separated and variations thereof is not intended to require complete separation of the iron oxides from the gangue material, but rather refers to the separation of the low grade ore material into a fraction having a higher concentration of iron oxides/lower concentration of gangue (the concentrate) and a fraction having a lower concentration of iron oxides/higher concentration of gangue (the tailings).

In one form of the invention, the iron ore stream is a comminuted iron ore stream.

In the context of the present specification, the term comminuted stream refers to a stream that has undergone comminution. It does not include streams that have been treated by gravity or magnetic separation techniques. It does not include waste streams or tailings streams.

In the context of the present specification, the term comminution shall be understood to encompass methods that reduce the average particle size of a material including blasting, material handling, crushing, grinding, milling, cutting and vibrating.

Preferably, the comminuted stream is a stream that has only been crushed and/or sized. Said sizing may comprise sizing to 100 mm diameter, 250 mm diameter or 500 mm diameter.

Preferably, the concentrate stream has a sufficiently high iron concentration to be stockpiled. Preferably, the concentrate stream has a sufficiently high iron concentration to be stockpiled with no further treatment.

In one form of the invention, the tailings stream is sent to waste.

The method of the invention may comprise the additional step of:

- contacting the tailings stream with a second magnetic field and magnetically separating the tailings stream into a second concentrate stream and a second tailings stream.

The step of:

- contacting the tailings stream with a second magnetic field and magnetically separating the tailings stream into a second concentrate stream and a second tailings stream may be repeated by contacting the second tailings stream with a third magnetic field to provide a third concentrate stream and a third tailings stream.

The step of:

- contacting the tailings stream with a second magnetic field and magnetically separating the tailings stream into a second concentrate stream and a second tailings stream may be repeated n times to provide an nth concentrate stream and an nth tailings stream.

Preferably, the step of contacting the fines fraction with a magnetic field and separating the fines fraction into a concentrate stream and a tailings stream comprises contacting the fines fraction with at least one of a high intensity magnetic field, a medium intensity magnetic field and a low intensity magnetic field.

In the context of the present invention, the term 'low intensity magnetic field' will be understood to refer to a magnetic field that separates highly magnetically susceptible particles such as magnetite particles from particles that are weakly susceptible or non-susceptible to a magnetic field.

Where the method comprises the use of more than one magnetic field, the strength of the magnetic fields are of increasing intensity. Such an arrangement is particularly advantageous where the iron ore stream has higher proportions of iron ores with higher magnetic susceptibility such as magnetite. Where the method comprises the use of two magnetic fields, the second magnetic field has a greater intensity than the first magnetic field. Where the method comprises the use of three magnetic fields, the third magnetic has a greater intensity than both the first and second magnetic fields and the second magnetic field has a greater intensity than the first magnetic field.

Where the method of the invention comprises the additional step of:

- contacting the tailings stream with a second magnetic field and magnetically separating the tailings stream into a second concentrate stream and a second tailings stream, the second magnetic field preferably has higher magnetic intensity than the first magnetic field.

In one form of the invention, the fines fraction is contacted with a low intensity magnetic field and the tailings stream is contacted with a high intensity magnetic field.

In one form of the invention, the fines fraction is contacted with a low intensity magnetic field and the tailings stream is contacted with a medium intensity magnetic field.

In one form of the invention, the fines fraction is contacted with a medium intensity magnetic field and the tailings stream is contacted with a high intensity magnetic field.

In one form of the invention, the fines fraction is contacted with a first low intensity magnetic field and the tailings stream is contacted with a second low intensity magnetic field, wherein the magnetic intensity of the second low intensity magnetic field is higher than the magnetic intensity of the first low intensity magnetic field.

In one form of the invention, the fines fraction is contacted with a first medium intensity magnetic field and the tailings stream is contacted with a second medium intensity magnetic field, wherein the magnetic intensity of the second medium intensity magnetic field is higher than the magnetic intensity of the first medium intensity magnetic field.

In one form of the invention, the fines fraction is contacted with a first high intensity magnetic field and the tailings stream is contacted with a second high intensity magnetic field, wherein the magnetic intensity of the second high intensity magnetic field is higher than the magnetic intensity of the first high intensity magnetic field.

The medium intensity magnetic field and/or the low intensity magnetic field may be provided in the form of a magnetic drum separator.

The step of magnetically separating the fines fraction into the concentrate stream and the tailings stream may comprise wet or dry magnetic separation.

Known prior art of wet magnetic separation technology is applied to tailings or mineral waste streams. The present invention is applied to ore generated upstream in the ore preparation process which advantageously increases the overall process efficiency.

The proposed invention also provides protection of the magnetic equipment by ensuring the particle size does not exceed the maximum allowable particle size, thereby increasing mass recovery and reducing potential for process delays and equipment damage.

Advantageously, utilising a coarser fraction in the magnetic circuit than the prior art involves a much larger mass of material being treated, which substantially increases the overall benefit of the magnetic separation. This results in higher overall iron content and lower contamination levels than would be achieved if only the tailings stream was utilised to feed the magnetic separator as well as an increased mass recovery.

In one form of the invention, the step of sizing the stream comprises sizing the stream to provide a fines fraction of less than 2.0 mm diameter particle size.

In one form of the invention, the step of sizing the stream comprises sizing the stream to provide a fines fraction of less than 1.0 mm diameter particle size.

In one form of the invention, the step of sizing the stream comprises sizing the stream to provide a fines fraction of less than 0.5 mm diameter particle size.

In one form of the invention, the step of sizing the stream comprises sizing the stream to provide a fines fraction of less than 0.25 mm diameter particle size.

In one form of the invention, the step of sizing the stream comprises sizing the stream to provide a fines fraction of less than 0.1 mm diameter particle size.

In one form of the invention, the step of sizing the stream comprises sizing the stream to provide a fines fraction of less than 0.05 mm diameter particle size.

In one form of the invention, the step of sizing the stream comprises sizing the stream to provide a fines fraction of less than 0.025 mm diameter particle size.

Preferably, the step of contacting the fines fraction with a high intensity magnetic field comprises contacting the fines fraction with a magnetic field of 500 to 18000 Gauss. In one form of the invention, the step of contacting the fines fraction with a high intensity magnetic field comprises contacting the fines fraction with a magnetic field of 2000 to 10000 Gauss. In one form of the invention, the step of contacting the fines fraction with a high intensity magnetic field comprises contacting the fines fraction with a magnetic field of 1600 to 6000 Gauss. In one form of the invention, the step of contacting the fines fraction with a high intensity magnetic field comprises contacting the fines fraction with a magnetic field of 3000 to 6000 Gauss.

Preferably, the step of contacting the fines fraction with a high intensity magnetic field comprises contacting the fines fraction with the magnetic field in a wet high intensity magnetic separator.

Preferably, the wet high intensity magnetic separator is a vertical wet high intensity magnetic separator.

In one form of the invention, the step of contacting the fines fraction with a magnetic field comprises contacting the fines fraction with a low intensity magnetic field.

Preferably, the step of contacting the fines fraction with a high intensity magnetic field comprises contacting the fines fraction and the magnetic field in a low intensity magnetic separator.

Preferably, the step of contacting the fines fraction with a low intensity magnetic field comprises contacting the fines fraction with a magnetic field of 500 to 3000 Gauss.

In one form of the invention, the step of contacting the fines fraction with a magnetic field comprises contacting the fines fraction with a medium intensity magnetic field.

Preferably, the step of contacting the fines fraction with a medium intensity magnetic field comprises contacting the fines fraction and the magnetic field in a medium intensity magnetic separator.

In one form of the invention, the fines fraction is split into a plurality of fractions and each one of the plurality of fines fractions is fed independently to a different magnetic separator or plurality of magnetic separators operating in parallel.

Where the step of magnetic separation of iron ore from the fines fraction comprises more than one magnetic separators, the more than one magnetic separators may be operated in parallel, in series or a combination of both.

The concentrate from a magnetic separator may be passed to a thickener or other gravity separation stage and/or a dewatering circuit.

Advantageously, the operating conditions of the present invention facilitate the handling of a wide range of stream properties with respect to iron ore content and type. Without being limited by theory, it is believed that the present process is most applicable to streams containing about 40-62 w/w % iron.

Advantageously, the operating conditions of the present invention facilitate the handling of a wide range of stream properties with respect to iron ore content and type. Without being limited by theory, it is believed that the present process is most applicable to streams containing more 40 w/w % iron in the bulk sample. Though ore with less than 40% w/w % iron could also be treated if the iron bearing ore has sufficient magnetic susceptibility

BRIEF DESCRIPTION OF THE DRAWINGS

Further features of the present invention are more fully described in the following description of a non-limiting embodiment thereof. This description is included solely for the purposes of exemplifying the present invention. It should not be understood as a restriction on the broad summary, disclosure or description of the invention as set out above. The description will be made with reference to the accompanying drawings in which.

DESCRIPTION OF EMBODIMENTS

Throughout the specification, unless the context requires otherwise, the word "solution" or variations such as "solutions", will be understood to encompass slurries, suspensions and other mixtures containing undissolved solids.

Throughout this specification, unless the context requires otherwise, the word "comprise" or variations such as "comprises" or "comprising", will be understood to imply the inclusion of a stated integer or group of integers but not the exclusion of any other integer or group of integers.

Those skilled in the art will appreciate that the invention described herein is amenable to variations and modifications other than those specifically described. It is to be understood that the invention includes all such variations and modifications. The invention also includes all of the steps, features, compositions and compounds referred to or indicated in the specification, individually or collectively and any and all combinations or any two or more steps or features.

In conventional iron ore operations, fine iron ore streams are typically wet processed using size separation processes, the oversize material going to final product. The undersize material of about −1.0 mm is passed to a wet processing circuit to remove coarser material.

Figure 1:
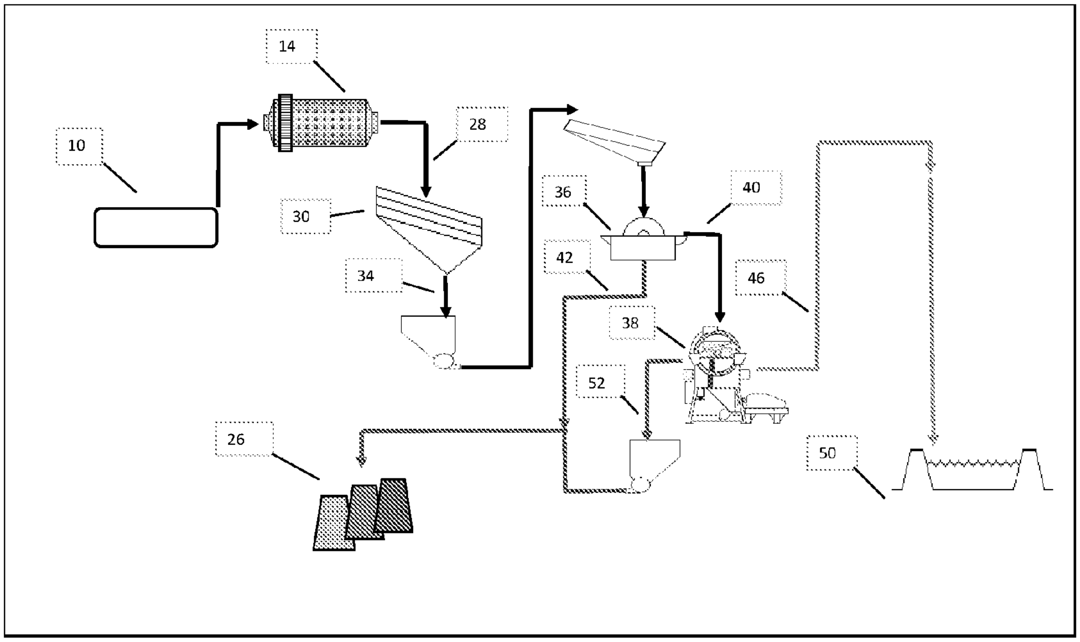
FIG. 1 is a flow sheet of the beneficiation process in accordance with an embodiment of the present invention.

In FIG. 1 there is provided a flow sheet of a beneficiation process in accordance with an embodiment of the present invention.

Scrubber feed 10 is passed to a wet scrubber stage 14. The undersize material 28 (typically less than 65 mm) from the scrubber 14 is wet screened 30 at 1.0 to 3.0 mm. The wet screening underflow 34 reports to the magnetic circuit.

The magnetic circuit comprises a magnetic drum separator 36 and a vertical wet high intensity magnetic separator (WHIMS) 38. The tailings stream 40 from the magnetic drum separator 36 reports to the WHIMS 38. The concentrate stream 42 from the magnetic drum separator 36 reports to a product stream 26.

In the WHIMS circuit, a series of magnets produce an undulating magnetic field and appropriately spaced water sprays wash the particles in the appropriate collection hopper as the slurry moves through the magnetic field. There may be provided more than one hopper to collect materials of varying magnetic strengths. Some may be retained, some recycled back through the WHIMS and some discarded.

The tailings stream 46 from the WHIMS 38 is thickened 48 and passed to a tailings storage facility 50. The second concentrate stream 52 from the WHIMS 38 reports to a product stream 26.

Results obtained from both pilot plant and laboratory scale trials demonstrate a number of advantages that the present invention has over existing processes. By applying a low magnetic field strength (low/medium intensity magnets) as a first step to remove ore with a high magnetic susceptibility, the feed to the variable high intensity magnets is stripped of particles that can cause processing issues. The use of a single or multiple magnetic separators incorporating variable magnetic field strength in accordance with an aspect of the invention allows for continuous process adjustments to ensure the correct field strength, based on the magnetic susceptibility of the feed.

Figure 2:
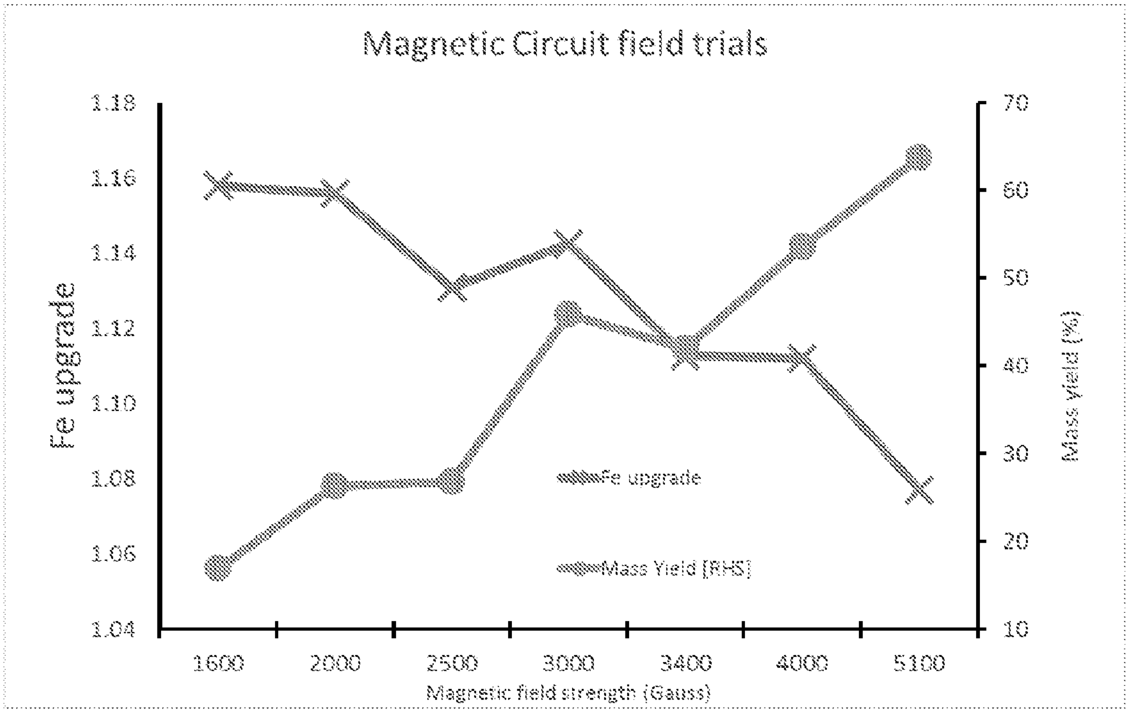
FIG. 2 presents the results from a pilot plant operating in accordance with an embodiment of the present invention demonstrating Fe upgrade and mass yield vs magnetic field strength.

Field trials have demonstrated that the invention can increase the Fe content from a low grade iron ore feed (typically 44 to 55 wt/wt % Fe content) to more than 58 wt/wt % Fe resulting in a saleable product by using a magnetic field strength of 1600 to 3400 Gauss with a varied mass yield that could be in excess of 45% reporting to magnetic concentrate (see FIG. 2). With a medium grade feed (typically 55 to 58 wt/wt % Fe), a higher magnetic field strength of 4000 to 6000 Gauss can be applied resulting in a substantial increase in mass yield of up to 60% while still maintaining an acceptable product grade of more than 58 wt/wt % Fe. With high grade iron ore feed (58 to 66 wt/wt % Fe), mass yield in excess of 60% can be achieved at magnetic field strength of 6000 to 10000 Gauss.

Figure 3:
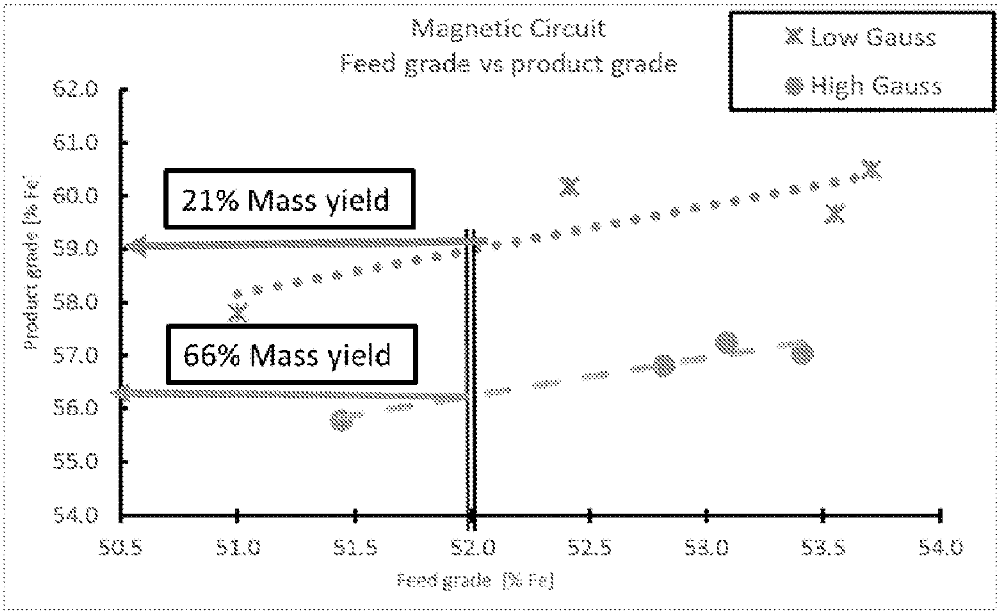
FIG. 3 presents the relationship between feed grade and product grade.

Employment of a lower magnetic field strength results in a higher product grade at the expense of mass recovery while a higher field strength increases the mass yield at the expense of the product grade. As shown in FIG. 3, a relatively low magnetic field (2500 Gauss) at a feed grade of 52% Fe yielded a product with 59% Fe with a mass yield of 21% w/w while applying a higher field strength (5100 Gauss) resulted in a product grade of 56.2% Fe with a mass yield of 61% w/w It will be appreciated that magnetic susceptibility of the ore (e.g. different ratios of the various types of iron ore might have the same Fe grade but different magnetic susceptibility) will affect the most suitable magnetic field strength.

Figure 4:
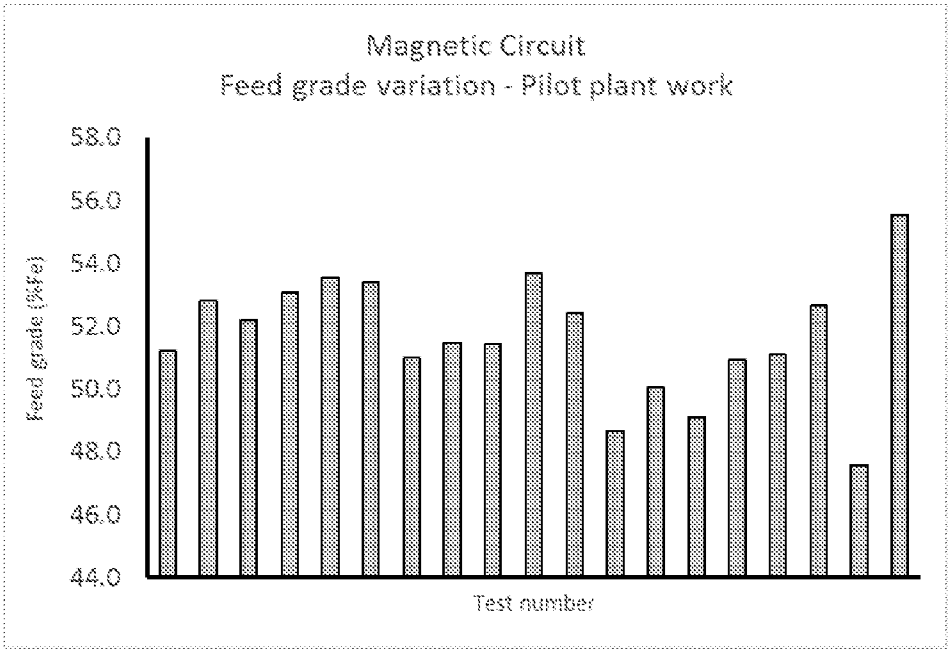
FIG. 4 presents the results from a pilot plant with a range of feed types.

As shown in FIG. 4, the proposed beneficiation circuit can handle a wide range of feed types (in terms of Fe content or grade). The feed was obtained from a typical iron ore comminution circuit. The capability to alter the magnetic field strength can be used to select the optimum operating conditions for a feed type.

Figure 5:
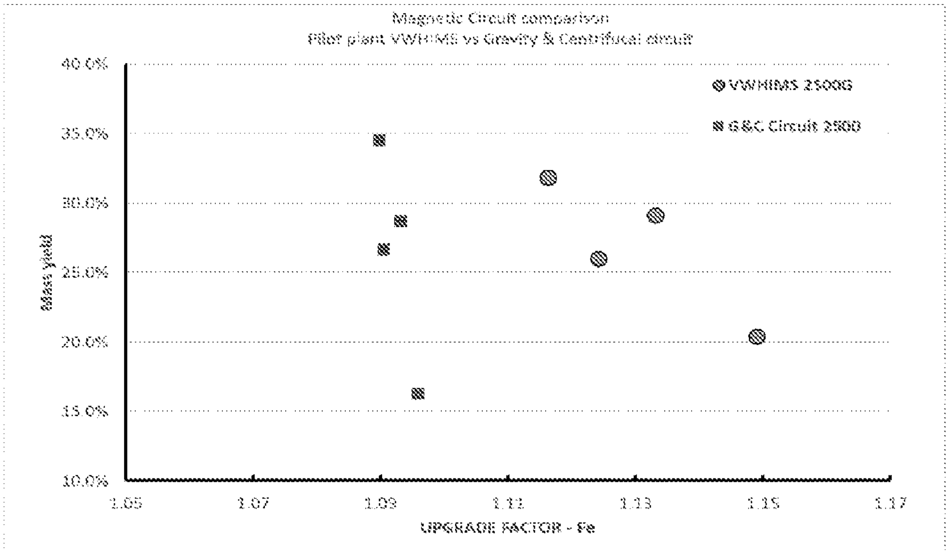
FIG. 5 presents a comparison of beneficiation in accordance with the present invention and a conventional circuit.
Figure 6:
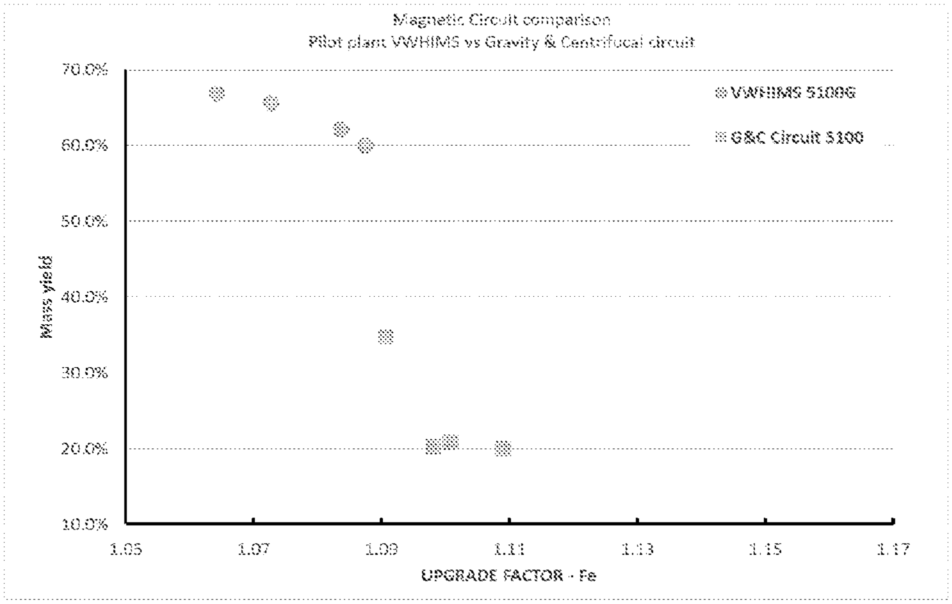
FIG. 6 presents a comparison of beneficiation in accordance with the present invention and a conventional circuit.

The data in FIGS. 5 and 6 compare the metallurgical performance of a wet magnetic beneficiation circuit in accordance with the present invention and a conventional wet beneficiation circuit using gravity and centrifugal forces (e.g. cyclones and spirals). Samples were obtained from both the pilot magnetic plant and the conventional circuit and compared in terms of mass yield (w/w %) and the Fe upgrade as a ratio of the Feed grade and product grade.

FIG. 5 demonstrates that a low Gauss setting the magnetic circuit mass yield is similar to the conventional circuit, but with improved upgrade with resulting improvement in quality.

FIG. 6 demonstrates that at high Gauss settings the upgrade ration of the magnetic circuit is less than the conventional circuit, but with vastly improved mass yield while the final product grade is still within an acceptable range.

Figure 7:
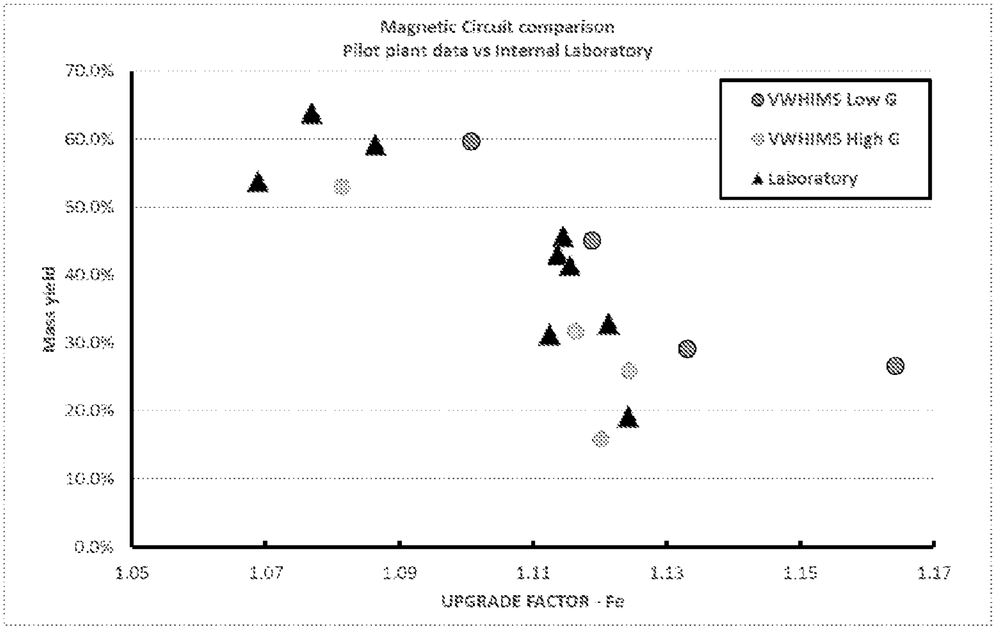
FIG. 7 presents a comparison of beneficiation in accordance with the present invention and laboratory results.
Figure 8:
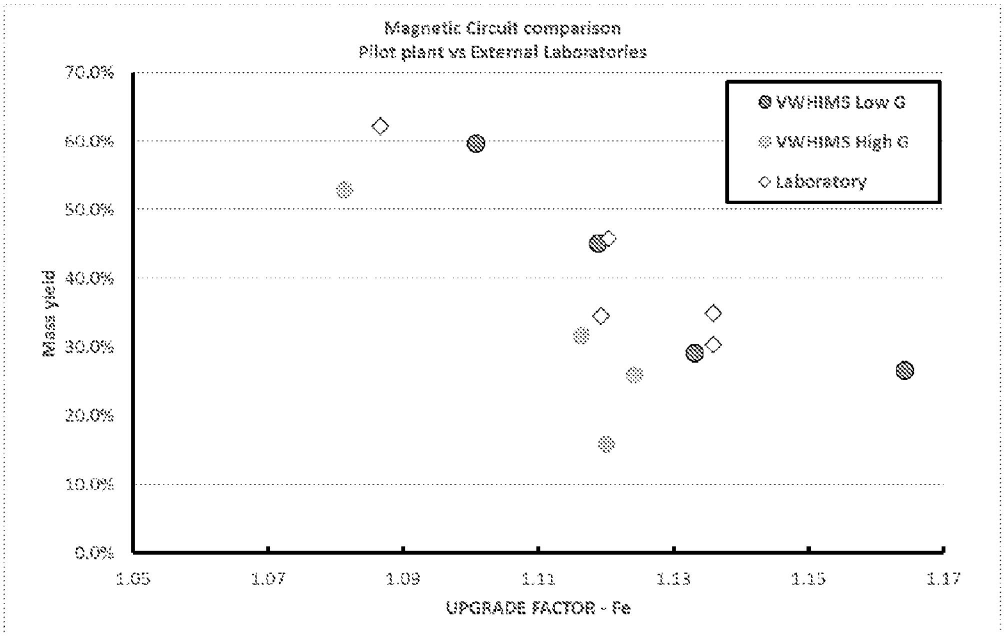
FIG. 8 presents a comparison of beneficiation in accordance with the present invention and laboratory results.

FIGS. 7 and 8 compares results from pilot plant results with test work conducted on laboratory scale.

FIG. 7 demonstrates that the results obtained on laboratory scale magnetic circuit test work at an internal facility compares very well with the pilot test work conducted at an operating plant. FIG. 8 show the comparison with the same pilot plant data with laboratory scale test work conducted at two external facilities.

Figure 9:
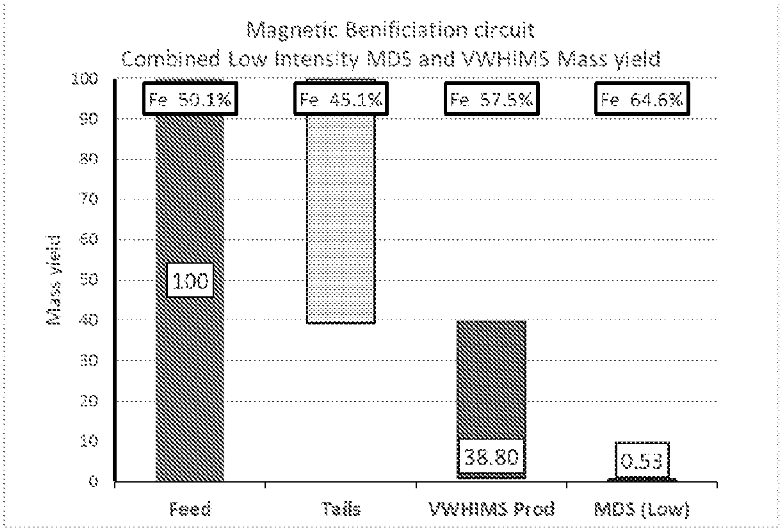
FIG. 9 presents a plot of the mass yield and grade when a Magnetic Drum Separator is used in series with a WHIMS unit.
Figure 10:
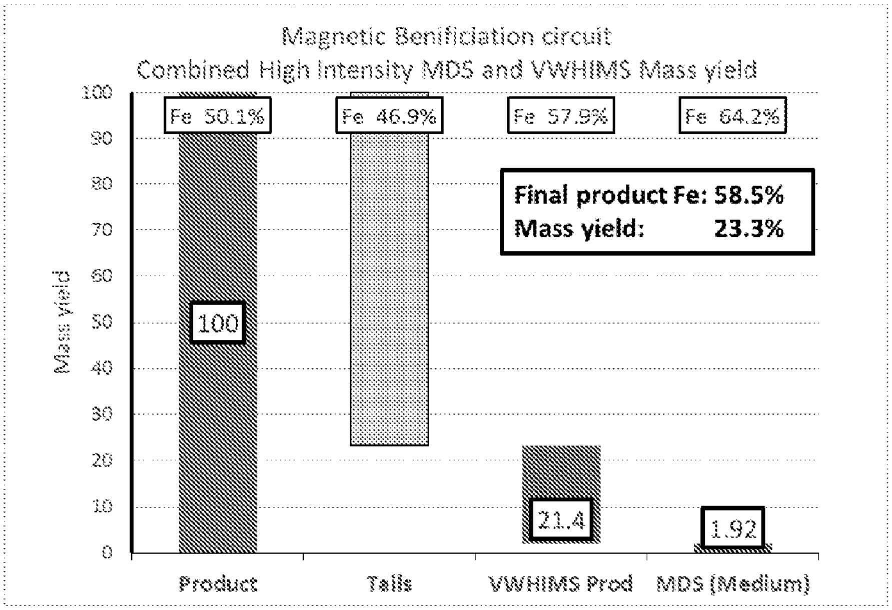
FIG. 10 presents a plot of the mass yield and grade when a Magnetic Drum Separator is used in series with a WHIMS unit.

FIGS. 9 and 10 demonstrate the mass yield and grades (% Fe) when a Magnetic Drum Separator (MDS) is used in series with a WHIMS unit.

FIG. 9 shows the relative low mass yield on a low magnetic intensity MDS unit but with high Fe grade and the non-magnetic fraction then treated by a WHIMS unit to produce an upgraded final product. FIG. 10 show similar results when a medium magnetic intensity MDS unit is used resulting in a higher mass yield due to the higher magnetic field (1.92% vs 0.53%), but still relatively small when compared with the VWHIMS mass yield The use of magnetic force as in the proposed invention also results in higher process efficiency compared to the alternative processes which rely on centrifugal and gravitational forces to separate the iron ore and gangue. By varying the magnetic field, feed rate and slurry properties the treatment of various grades and qualities of ore can be treated efficiently in the proposed process invention.

The proposed invention includes processes that are easier to control and adjust for varying feed stream qualities therefore ensuring better process efficiencies and quality.

The invention claimed is:

1. A method of beneficiating iron ore streams, the method comprising the steps of:

sizing an iron ore stream to provide a wet fines fraction of less than 3.0 mm diameter particle size;

contacting the wet fines fraction of less than 3.0 diameter particle size with a magnetic field directly, so that the fines fraction is magnetically separated into a concentrate stream and a tailings stream; and contacting the tailings stream with a second magnetic field and magnetically separating the tailings stream into a second concentrate stream and a second tailings stream;

wherein the iron ore stream is a comminuted iron ore stream comprising about 40-66 w/w % iron and the concentrate stream has an iron concentration of at least 55 w/w % iron, wherein the tailings stream is an untreated tailings stream, and the second magnetic field is of higher intensity than the magnetic field.

2. A method of beneficiating iron ore streams according to claim 1, wherein the step of:

contacting the tailings stream with a second magnetic field and magnetically separating the tailings stream into a second concentrate stream and a second tailings stream is repeated by contacting the second tailings stream with a third magnetic field to provide a third concentrate stream and a third tailings stream.

3. A method of beneficiating iron ore streams according to claim 1, wherein the step of contacting the fines fraction with a magnetic field and separating the fines fraction into a concentrate stream and a tailings stream comprises contacting the fines fraction with at least one of a high intensity magnetic field, a medium intensity magnetic field and a low intensity magnetic field.

4. A method of beneficiating iron ore streams according to claim 1, wherein the step of contacting the fines fraction with a high intensity magnetic field comprises contacting the fines fraction with a magnetic field of 500 to 18000 Gauss.

5. A method of beneficiating iron ore streams according to claim 1, wherein the step of contacting the fines fraction with a high intensity magnetic field comprises contacting the fines fraction with a magnetic field of 2000 to 10000 Gauss.

6. A method of beneficiating iron ore streams according to claim 1, wherein the step of contacting the fines fraction with a high intensity magnetic field comprises contacting the fines fraction with a magnetic field of 1600 to 6000 Gauss.

7. A method of beneficiating iron ore streams according to claim 1, wherein the step of contacting the fines fraction with a high intensity magnetic field comprises contacting the fines fraction with a magnetic field of 3000 to 6000 Gauss.

8. A method of beneficiating iron ore streams according to claim 1, wherein the fines fraction is split into a plurality of fractions and each one of the plurality of fines fractions is fed independently to a different magnetic separator or plurality of magnetic separators operating in parallel.

9. A method of beneficiating iron ore streams according to claim 1, wherein the iron ore stream comprises about 44-55 w/w % iron or about 55-58 w/w % iron or about 58-66 w/w % iron.

10. A method of beneficiating iron ore streams according to claim 1, wherein the second concentrate stream has an iron concentration of at least 55 w/w % iron.

11. A method of beneficiating iron ore streams according to claim 1, wherein the concentrate stream has an iron concentration of at least 60 w/w % iron.

12. A method of beneficiating iron ore streams according to claim 1, wherein the second concentrate stream has an iron concentration of at least 55 w/w % iron.

13. A method of beneficiating iron ore streams according to claim 1, wherein the second concentrate stream has an iron concentration of at least 60 w/w % iron.

14. A method of beneficiating iron ore streams according to claim 1, wherein the concentrate stream and the second concentrate stream are combined to form a combined concentrate stream and stockpiled.

15. A method of beneficiating iron ore streams according to claim 14, wherein the combined concentrate stream has an iron concentration of at least 55 w/w % iron.

16. A method of beneficiating iron ore streams according to claim 14, wherein the combined concentrate stream has an iron concentration of at least 60 w/w % iron.

17. A method of beneficiating iron ore streams according to claim 2, wherein the third concentrate stream has an iron concentration of at least 55 W/% iron.

18. A method of beneficiating iron ore streams according to claim 2, wherein the third concentrate stream has an iron concentration of at least 60 w/w % iron.

19. A method of beneficiating iron ore streams according to claim 2, wherein the concentrate stream and the second concentrate stream and the third concentrate stream are combined to form a second combined concentrate stream and stockpiled.

20. A method of beneficiating iron ore streams according to claim 19, wherein the second combined concentrate stream has an iron concentration of at least 55 w/w % iron.

21. A method of beneficiating iron ore streams according to claim 19, wherein the second combined concentrate stream has an iron concentration of at least 60 w/w % iron.

* * * * *